INVENTOR
REMUS N. BRETOI

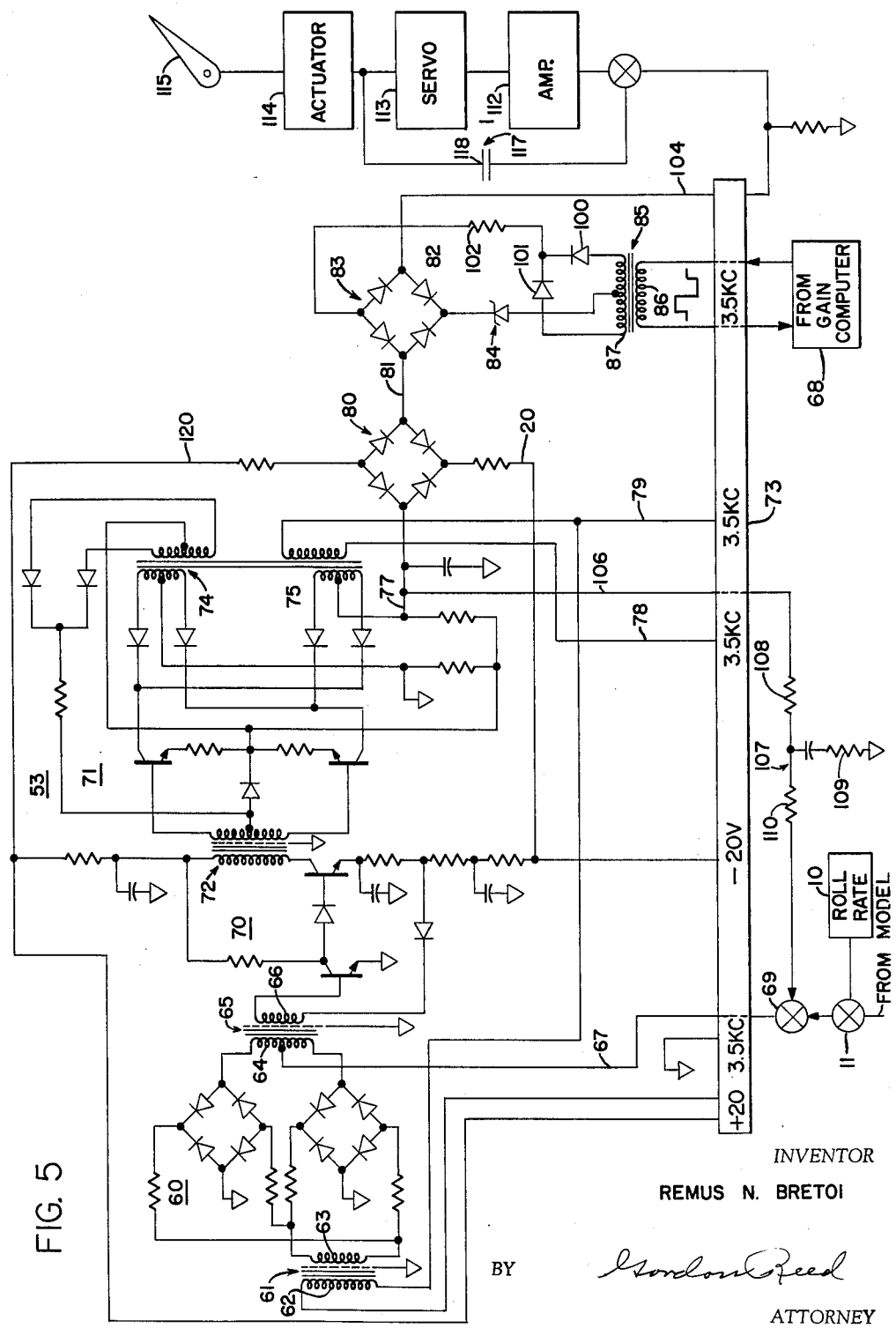

United States Patent Office 3,057,584
Patented Oct. 9, 1962

3,057,584
AUTOMATIC CONTROL APPARATUS
Remus N. Bretoi, St. Paul, Minn., assignor to Minneapolis-Honeywell Regulator Company, Minneapolis, Minn., a corporation of Delaware
Filed Mar. 1, 1960, Ser. No. 12,055
14 Claims. (Cl. 244—77)

This invention relates to improvements in automatic control apparatus and more particularly to control apparatus of the self-adaptive type having automatically adjusted operating features. The herein disclosed improved adaptive control apparatus to demonstrate its self-adjusting features has been applied to control of a high performance aircraft operable at wide extremes of flight conditions. This adaptive flight control system for a high performance aircraft is of the general type disclosed in a prior application of Anders Ljungwe and R. C. Lee, Serial No. 755,574, filed August 11, 1958.

In an adaptive control system of this type which automatically adjusts itself with varying flight conditions, a model and an adaptive controller, which controls a servomotor that controls the aircraft about an axis, constitute the primary features. The model in the adaptive flight control system provides the system with the selected standard of performance. It represents what the pilot wants in the aircraft handling characteristics, in other words it represents what the pilot would like the aircraft to do. Therefore, the model is an analog simulation of an ideal aircraft to the pilot.

In the operation of the model of the present arrangement, electric command signals to the model are derived from various sources, either from a pilot command source or from a craft flight condition sensor. The output of the model represents the desired airplane response to such command signal. Thus the output of the model is the specific performance the pilot desires from the aircraft for the given input.

It is the function of the adaptive controller by operating the servomotor to cause the aircraft response to duplicate substantially the response of the model. Under such conditions, the aircraft responds as the pilot would like it to respond. Thus the adaptive controller by operating the servomotor has as its function that of forcing the aircraft to follow closely the output of the model.

Since the adaptive controller forces the aircraft response to follow the model response, an adaptive system of this type is a non-linear high gain system which is evidenced by a residual oscillation frequency of the servomotor at low input signals when desired and actual response are nearly the same.

An object of this invention is to provide an improved adaptive aircraft control apparatus wherein aircraft response is made to closely follow the model response.

A further object of this invention is to provide novel means for controlling the amplitude of residual oscillation or amplitude of this residual motion.

A further object of this invention is to control the amplitude of residual motion by a novel amplitude modulator that substantially maintains residual motion at a selected constant amplitude.

A further object of this invention is to provide a novel amplitude modulator of the residual oscillation amplitude of the craft to vary the system gain to produce a limit cycle having a frequency about 5 to 10 times that of the model.

A further object of this invention is to provide a novel amplitude modulator for controlling residual oscillation amplitudes of a servomotor that controls an aircraft by linearly controlling the gain of an adaptive system for the servomotor.

Further objects and advantages of the invention will be realized upon consideration of the accompanying description had in conjunction with the subjoined drawings.

Figure 2:
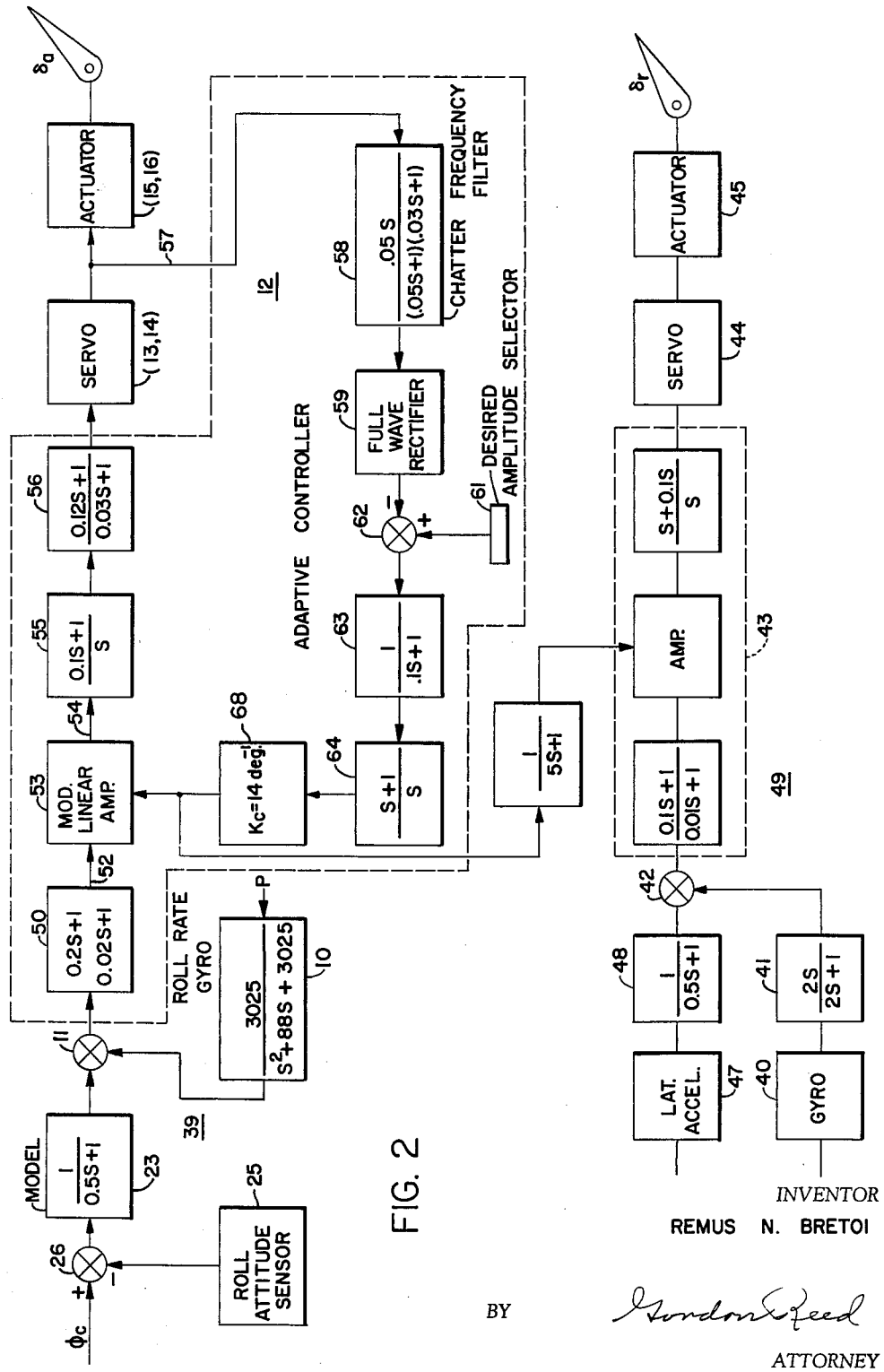
FIGURE 2 is a block diagram of the lateral axis control system and the vertical axis control system of FIGURE 1; wherein are included the transfer function of various element of the block diagram.
Figure 4A:
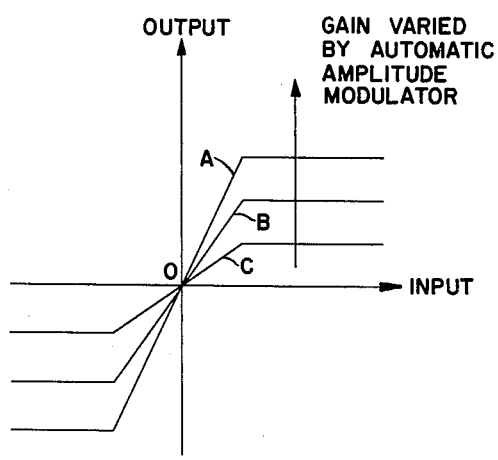
Figure 4B:
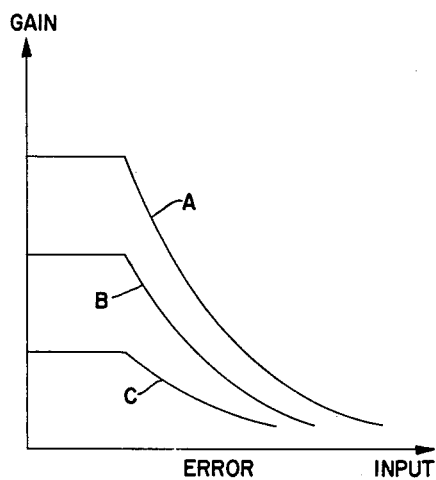

FIGURES 4A and 4B graphically illustrate characteristics of an amplifier of the adaptive controller of FIGURE 2; and FIGURE 5 shows an electrical schematic of one form of the novel amplifier and amplitude modulator of the adaptive controller.

Inasmuch as the combination of a model, an adaptive controller, and an aircraft have been heretofore utilized in the above-mentioned application and the novelty herein is primarily in the adaptive controller, only the general nature of the combination will be discussed. As stated, it is desired that the aircraft response duplicate the response of the model and that it is the function of the adaptive controller to force the aricraft to follow closely the output of the model. The following error between the aircraft and the output of the model can be kept reasonably small if the frequency band width of the inner loop of the adaptive controller, for example that which senses roll rate, be at least 5 to 10 times that of the model frequency band width. By way of amplification, in the present arrangement the model transfer function, relating the output to the input, is that of a simple lag device such as a resistor-capacitor lag network that represents the desired transient response of the craft. For low frequency input signals to the lag network, the output signal therefrom substantially follows the input. As the frequency is increased however, there is a point reached wherein the output is a considerable attenuation of the input signal. In other words, at frequencies beyond a band width of frequencies the output falls off. If the band width transfer capabilities of the inner loop of the adaptive controller are 5 to 10 times that of the model considered, it can be readily seen that the adaptive controller will force the aircraft to closely follow the output of the model. In other words, whatever control is passed through the model is closely followed by the aircraft since the inner loop natural frequency is made at least from 5 to 10 times that of the model frequency band width and no attenuation occurs.

It is the function of the adaptive controller to provide the compensation and gain adjustment necessary to keep the following error reasonably small at all flight conditions. This results in a residual oscillation often termed the limit cycle frequency.

The limit cycle frequency may be obtained from the rate gyro by direct measurement or analytically on a conventional phase-amplitude plot or graph wherein for various frequencies, the amplitude and phase of the output of the adaptive controller relative to the input under open cycle conditions is obtained. The limit cycle frequency is obtained at the cross-over point of the curve for a −180° phase shift.

If such curve falls below or outside the minus 1 amplitude value at −180° phase shift, a closed cycle response would be oscillatory and divergent.

The present gain changer or amplitude modulator for the adaptive controller tends to shift the phase-amplitude curve upwardly or downwardly to alter gain of the controller to prevent divergent oscillations but insure presence of residual motion. In other words, if divergent oscillations tend to occur indicating an increase in residual motion amplitude, this limit cycle amplitude magnitude consequently exceeds a set point or selected value of limit cycle amplitude and this amplitude difference is utilized to effect reversing of the operation of the amplitude modulator to thus reduce gain to thus prevent divergent oscillations. The system thus by means of the amplitude modulator or gain control operates substantially about the —180° phase shift and minus 1 amplitude point.

The magnitude of the characteristic residual motion amplitude is set just large enough to overcome the various thresholds of the system. A typical magnitude for some aircraft is the amplitude of the surface residual motion will be kept under 0.1 degree at a frequency of 6 cycles per second (c.p.s.).

The adaptive controller consists of a compensating network, a modified bi-stable element (modified linear amplifier), an electronic integrator, and an automatic amplitude modulator. The compensating network is a phase lead network which operates on the error signal, which is the difference of the model output and aircraft response, to provide anticipation and to maintain the frequency of the limit cycle relatively constant over the flight regime of the aircraft.

The modified bi-stable element herein is essentially a high gain linear amplifier with limited output.

The electronic integrator is used to obtain a proportional plus integral signal in the forward path of the inner loop.

The automatic amplitude modulator senses servomotor motion at the limit cycle frequency only and varies the gain of the modified bi-stable element or linear amplifier to maintain the forward loop gain at the highest stable value for all flight conditions. Should the gain be so high as to cause the system to be unstable and tend to develop divergent oscillations, the amplitude modulator readjusts the gain to prevent such divergent oscillations and thus stabilizes the system. Thus the automatic amplitude modulator compensates for changes in aircraft control surface effectiveness such as those due to a change in flight condition such as increase in air speed.

The system in brief operates with an error sufficiently small to stay within the linear portion of the modified bi-stable element or linear amplifier, whichever is used. In accomplishing this, a small controlled residual motion exists at the frequency corresponding to the neutral stability point $(-1, jo)$. The amplitude of this residual motion is kept constant at the servo output by the automatic amplitude modulator. If the amplitude of motion is larger than that designated by a bias voltage, the gain of the modified bi-stable or linear amplifier element is decreased, and vice versa.

The primary novelty herein is in the novel adaptive controller for an adaptive type automatic pilot irrespective of whether such adaptive controller is utilized in the yaw axis, roll axis, or elevator axis of an automatic pilot. It is preferred herein to disclose its application to the roll axis of a three-channel automatic pilot.

Figure 1:
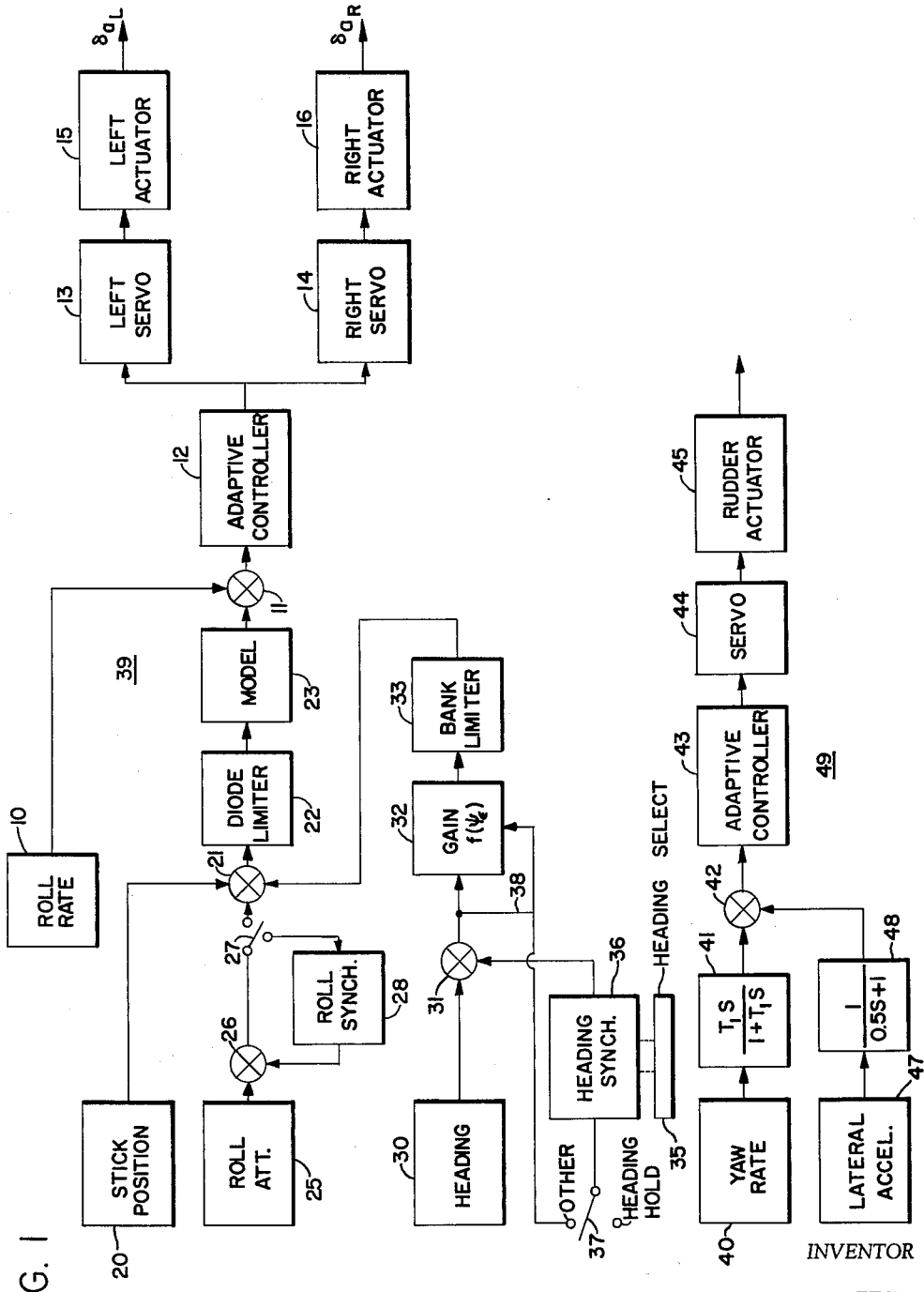
FIGURE 1 is a block diagram of a yaw and roll axis control apparatus for an aircraft including the novel adaptive controller.

Such application is shown in FIGURE 1 wherein a roll rate sensing device 10 which is continuously used for the primary inner loop feedback of the adaptive system applies its control signal through a summing differential 11 to an adaptive controller 12. The adaptive controller in turn operates a left servo 13 and a right servo 14 which respectively control a left aileron actuator 15 and a right aileron actuator 16 to position both aileron control surfaces of the aircraft.

FIGURE 1 includes four outer loop control modes for the roll channel: control stick steering, altitude hold, heading hold, and heading select.

In the control stick steering mode a stick force voltage signal derived from a stick position device 20 is supplied through a summing differential 21 and a diode limiter 22 and a model 23 to the summing differential 11. Summing the stick force signal with the roll rate signal only, provides a stick force per degree per second roll rate throughout the aircraft flight regime of speed and altitude.

Roll attitude hold is provided by supplying a roll attitude signal from a roll attitude sensing device 25 through a summing differential 26 and a control switch 27 to the summing differential 21. In this roll attitude hold mode, the roll attitude signal is thus supplied to the constant characteristic roll rate adaptive loop utilizing model 23.

Heading hold is obtained by adding a heading feedback signal supplied by heading sensing device 30, through a summing differential 31, gain control 32, thence through a bank limiter 33 to the signal summing differential 21.

Heading select is provided through a heading synchronizer 36 having a manual heading selector knob 35.

In the above arrangement, when on control stick steering from signals derived from the stick position device 20, the output from the roll attitude device 25 is supplied through switch 27 and roll synchronizer 28 to the summing differential 26. Additionally when on control stick steering mode, the output from the heading sensor 30 is supplied through a signal transmitter 38 and switch 37 to the heading synchronizer 36 which has its output supplied to the summing differential 31.

During roll attitude hold mode, the switch 27 is placed in the upper position shown in FIGURE 1 to render the roll synchronizer 28 ineffective. In the heading hold mode, switch 37 is moved to the downward position in the figure, thereby enabling the heading sensing device 30 to control and stabilize craft heading.

Inasmuch as heading stabilization is achieved through the roll axis control of banked turns coordination of such banked turns through operation of a rudder surface has been included. In the rudder axis, a yaw rate voltage signal sensed by a yaw rate device 40 is transmitted through a high-pass yaw rate network 41 to a summing differential 42 from whence the signal as modified is supplied to an adaptive controller 43. The controller 43 controls a servo 44 that operates a rudder actuator 45 of the aircraft rudder surface. Craft lateral acceleration sensed by a sensing device 47 as modified by lag device 48 is summed with the rate signal at differential 42, to provide Dutch roll damping and transient turn coordination for the yaw axis. No outer loop modes are used in the yaw axis.

In FIGURE 2, the roll axis 39 and the rudder axis 49 are again, as in FIGURE 1, shown in block diagram but with portions of FIGURE 1 omitted and the adaptive controller 12 being illustrated in fuller detail to show the components thereof. In FIGURE 2 the roll axis 39, the roll attitude sensor 25 supplies bank attitude to a summing differential 26 to which may also be supplied a roll attitude command signal ($\phi c$) as from an attitude sensor. The output from summing differential 26 is supplied to a model 23 which in the roll axis is illustrated as having a transfer fulcrum $1/0.5S+1$ comparable to a first order lag that defines the desired transient response of the craft. In the event the system should be utilized to control the craft in the pitch axis, the transfer function of the model would be that of a second order device with this transfer function:

$$\frac{\omega_n^2}{S^2+2\zeta\omega_n S+\omega_n^2}$$

with $S$=La Place operator, $\omega_n$=natural frequency of the model, $\zeta$=model damping ratio.

The output of the model is summed with the roll rate signal from the roll rate sensor 10 at summing differential 11 and the output from the differential 11 is supplied to the adaptive controller. The adaptive controller in turn controls the servo 13 which in turn controls the actuator 15 that positions an aileron surface of the craft.

In the adaptive controller 12, the output from differential summing device 11 is applied to a lead network 50 which may be of a resistor-capacitor type. The output from network 50 is supplied through transmitting means 52 to a modified linear amplifier. The output from the amplifier 53 is carried by transmitting means 54 to a proportional plus integral network 55 and then through a lead network 56 to control of the servomotor 13. The primary purpose of the proportional plus integral network 55 is to assure that the servomotor 13 operates in a proportional plus integral manner.

The proportional-integral displacement of servomotor 13 in turn controls the actuator of the aircraft which is operably connected to the aileron surface. The arrangement is such that the displacement of the aileron surface is in accordance both with a time integral of the signal on transmitting means 54 and proportional to the magnitude of such signal.

Figure 3:
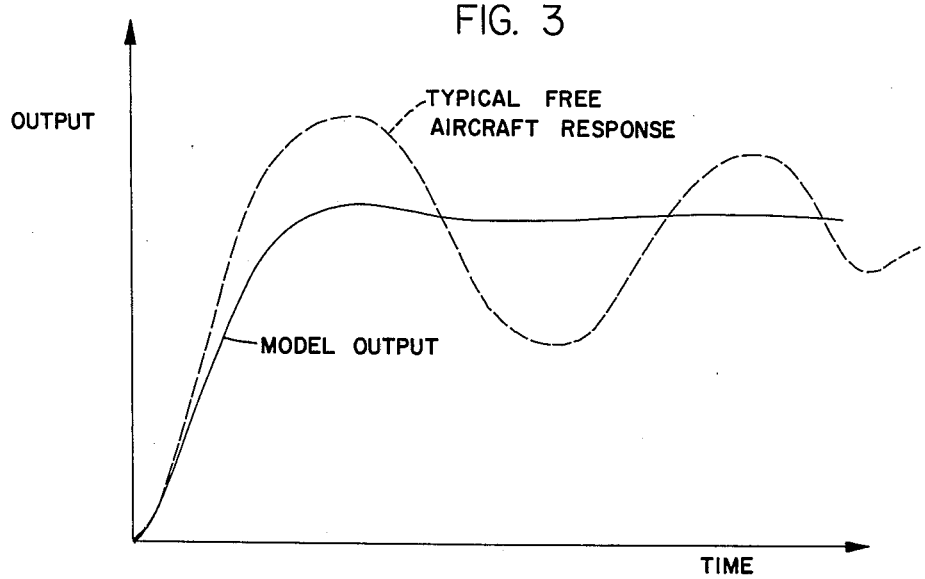
FIGURE 3 represents a model response to a step input compared with a free aircraft response.

By means of the adaptive controller 12, the aircraft is forced to closely follow the output of the model 23 to obtain quick rise slight overshoot of the craft response compared to the free airplane response to such input to the model, as shown in FIGURE 3. Because of this close following, which requires that the adaptive controller-aircraft be a high gain combination, the servomotor 13 will have a residual oscillation which is effective in the adaptive controller in a manner to be described.

The residual oscillations of servomotor 13 are applied through transmitting means 57 to a filter 58 which transmits primarily the signal having the frequency due to the residual oscillation. This residual oscillation however may vary in magnitude or amplitude. The output from the filter 58 is applied to a full wave rectifier 59 which converts the residual amplitude signal to an absolute quantity. The absolute quantity is subtracted at a summing point 62 from a signal derived from a selective limit cycle amplitude or residual amplitude set point device 61. The difference from differential 62 is supplied through a one-second lag network 63 to a proportional plus integral network 64 that in turn controls a linear amplifier 68. The output of the amplifier 68 is applied to the linear amplifier 53 to vary the gain and limit of amplifier 53 as will be clarified by discussion of FIGURES 4A and 4B below.

FIGURE 4A represents the output of the linear amplifier 53 for various magnitudes of input signal. The average output voltage is controlled by a gain changer. Graph A of FIGURE 4A represents the output of amplifier 53 when its output varies linearly with an input and full time output is limited to approximately 10 volts average. Graph B is obtained with the similar range of input signals as in A, but with the output time period decreased, to about two-thirds the full conducting period. Similarly with the amplifier 53 conducting but one-third of its time, but with the same values of input signals applied thereto as in A, the average output of amplifier 53 is illustrated by graph C. It will be noted that the portions of graphs A, B, and C passing through the origin O have various slopes and these represent different gains. These gains are controlled by the gain changer 82 as will be more fully apparent from consideration of FIGURE 5.

FIGURE 4B is a graph of gain and error input to the amplifier 53 which by comparison with FIGURE 4A shows, for example, the straight portion of graph A that passes through the origin as a constant gain until the limit output is reached when the gains for the various error inputs drops off rapidly. The similar relationship is shown for graphs B and C.

The combination of lead network 50, amplifier 53, and amplifier 65 of FIGURE 2 may be provided in various embodiments. The particular embodiment of this combination disclosed herein is shown in detail in FIGURE 5 with sufficient portion of the remainder of the roll axis control apparatus to show the function of the combination therein.

The amplifier 53 of FIGURE 5 comprises a diode modulator 60, an amplifier section 70, a discriminator section 71, and a limiter 80. The diode modulator 60 includes a transformer 61 having a primary winding 62 energized from a suitable A.C. source, supplying for example 3.5 kc. voltage. The transformer includes a secondary winding 63. On the output side of the diode modulator there is arranged a transformer 65 having a primary winding 64 with a center tap receiving D.C. voltage signals through conductor 67 and terminal block 73 from the D.C. signal source. In the present arrangement and as also shown in FIGURE 2, the D.C. signals are obtained from a summing differential 11 which represents the output of the model 23 and a roll rate gyroscope 10.

Transformer 65 includes a secondary winding 66 which receives the modulated D.C. signal and amplifies the same through a suitable transistor arrangement. The output of the amplifier section 70 is applied to a primary winding of a transformer 72 which has its output coupled through the transformer secondary to the discriminator section 71. Included in the discriminator sections 71 are a pair of transformers 74, 75. Transformer 75 has its primary winding energized from an A.C. signal source through suitable conductors 78, 79 extending therefrom to terminal block 73. The discriminator amplifier 71 is arranged to provide a D.C. output on conductor 77 which is supplied to a limiter 80 so that the utilized output of the discriminator amplifier is approximately 10 volts. The diode limiter 80 is of the conventional arrangement and has D.C. control voltage of +20, −20 volts applied to opposite sides thereof. The output from the limiter 80 is supplied to a conductor 81 which in turn is connected to the variable gain changer 82. The gain changer arrangement 82 comprises a diode bridge arrangement 83, a zener diode 84, a transformer 85, diodes 100, 101 and a resistor 102. The transformer 85 comprises a primary winding 86 which is energized from the amplifier 68 of FIGURE 2. This amplifier 68 also in FIGURE 5 is of the saturable reactor type having a D.C. input voltage and square wave or pulse width modulated A.C. output wherein the width of the pulse is in accordance with the amplitude of the D.C. input signal. The approximate amplitude of such square wave is approximately 40 volts.

The transformer 85 includes a secondary winding 87 having one end connected through diode 100 and resistor 102 to one side of the diode bridge 83 and the opposite end is connected through diode 101 and resistor 102 to the same side of the diode bridge. The opposite side of the bridge 83 is connected through a zener diode 84 to a center tap of secondary winding 87. By the above arrangement of the diodes 100, 101, the D.C. input voltage to the amplifier 68 which is converted to an A.C. output and supplied to transformer 85 is again converted to a D.C. voltage.

In the arrangement of the gain changer 82, the breakdown voltage of the zener diode 84 is approximately 28 volts and greater than that of the diodes in diode bridge 83. The amplitude of the voltage supplied to transformer 85 is approximately 40 volts and the width of each voltage pulse in the transformer winding 86 is in accordance with the magnitude of the D.C. input signal to amplifier 68.

The gain changer 82 operates as follows. We have stated that the output of amplifier 68 is a square wave of approximately 40 volts amplitude and of a width which varies with the input signals to amplifier 68. Assuming a large input signal to amplifier 68, the square wave output will be of full width. This output voltage of amplifier 68 will, through the transformer 85, effect a continuous current through resistor 102 and diode bridge 83.

Considering the overall adaptive controller voltage output, for small input signals into the diode modulator section 60 by conductor 67 from differential 11 there will be on conductor 104 a small average output voltage for full pulse width. However as the magnitude of the D.C.'s input signal on conductor 67 increases the average output voltage on conductor 104 increases in accordance therewith. Ultimately when the input signal on conductor 67 attains a predetermined magnitude, a full D.C. output voltage of 10 volts appears on conductor 81 and an average output voltage of 10 volts appears on conductor 104. In the event that the signal on conductor 67 increases additionally in magnitude, there is no additional increase in the average voltage on conductor 104. The above operation is illustrated by graph A of FIGURE 4A.

Graphs B and C of FIGURE 4A are obtained in the following manner. If the width of the square wave supplying primary winding 86 is decreased as will be the case when the input signal to amplifier 68 is decreased, the average voltage on conductor 104 will decrease in accordance therewith. Thus instead of a 10 volt maximum average voltage being provided on conductor 104 for a 10 volt maximum input to diode bridge 83 for full square wave pulse width, a decrease in the pulse width say to two-thirds full pulse width provides a maximum average voltage on conductor 104 as shown in graph B.

At this time should the signal input on conductor 67 be decreased, the average output voltage on conductor 104 will decrease accordingly. If the control signal input on conductor 67 is decreased to zero, the average voltage on conductor 104 likewise decreases to zero.

Similarly, if the square wave pulse width from amplifier 68 is decreased to one-third full width, the average voltage on conductor 104 will be as illustrated in graph C of FIGURE 4A.

It is thus evident that for various signal inputs to conductor 67 that the gain of the amplifier 53 is controlled by the pulse width from amplifier 68. It is further noted that the pulse width from amplifier 68 depends upon a D.C. input thereto.

In order to provide an effect on amplifier 53 corresponding to that provided by the rate network 50 of FIGURE 2, a lag device is provided in the feedback loop of the amplifier. For this purpose the output on conductor 77 is transmitted through a subconductor 106 to a lag network 107 which is connected through a summing resistor 110 to a summing point or summing differential 69. The lag device 107 may be conventionally of the resistor-capacitor type having a resistor 108 and capacitor 109 connected in series to ground with the terminal of resistor 108 and capacitor 109 being connected to the summing resistor 110.

The D.C. output voltage on conductor 104 in turn is supplied to a second amplifier 112 which differentially energizes in known manner a pair of windings that control the displacement of a control valve which in turn controls a hydraulic form of servomotor 113. The servomotor in turn controls the aircraft actuator that positions the aileron surface. The output from the servomotor 113 is supplied through a feedback connection 117 to the input side of the amplifier 112. In order to provide the proportional plus integral effect of device 55 of FIGURE 2, the feedback arrangement 117 may including a capacitor 118 which provides a high-pass feedback. Functionwise the capacitor 118 causes the servo 113 to act as an integrator at low frequencies and as a proportional controller at high frequencies. Thus a proportional plus integral control is provided by the above feedback relation.

Reviewing, it is the function of the adaptive controller to control the actuator of the control surface of the craft to obtain close following between the response of the aircraft and the output of the model 23. Such following may be substantially obtained by utilizing a high gain adaptive controller. When the gain in the system is high however, the system may tend to become unstable. This instability is indicated by a tendency to oscillate at low input signals or small following errors in the present arrangement. Such oscillation is evidenced by servo motion. The automatic amplitude modulator comprising gain changer 82 in controller 12 senses the servo motion, as stated, at the limit cycle or oscillation frequency only. The amplitude of servo motion is summed with a selected bias amplitude and in turn the difference is supplied as an input D.C. signal to the amplifier 68. Should the amplitude of the residual oscillation tend to become divergent or increase, the above difference will reduce the gain of the amplifier 53 through its control of amplifier 68.

On the other hand, if there is no detected amplitude of oscillation of servo 13, the selected bias voltage from device 61 through the amplifier 68 will increase the gain of amplifier 53 so that the gain of the apparatus will be increased as reflected by subsequent residual motion of the servo 13.

The amplitude of this residual motion may be kept automatically substantially constant by the automatic amplitude modulator of controller 12, for all flight conditions of the aircraft. Thus if the amplitude of the servo motion is larger than that designated by the bias voltage source 61, the gain of the amplifier 53 is decreased.

It will now be apparent that I have provided an adaptive autopilot for an aircraft having a novel adaptive controller including a unique gain changer for varying the residual amplitude of oscillation or residual motion of the servomotor that controls the aircraft about an axis, such variation of residual amplitude being achieved in said adaptive system by linearly adjusting the gain in said system in accordance with departures from a desired residual servo amplitude motion and that this residual motion amplitude may be selectively varied.

What is claimed is:

1. Control apparatus for an aircraft having a flight condition control device displaceable variable extents for applying a variable moment to the craft about an axis of the craft, comprising, in combination: a source control signal; a model responsive to said signal and developing an output signal in accordance with a desired flight response of the aircraft; a craft flight condition sensing means developing a third signal in accordance with said actual aircraft flight response condition; means combining said output and third signals; a linear output providing control means, including an amplifier, developing an output whose magnitude is in accordance with an input control signal and responsive to said combined signal; a servomotor controlled by said control means and operating said device so that the moment applied to the craft is in accordance with the output of said control means; filter means responsive to cyclic motions of a selected frequency of said servomotor and developing a fourth signal; adjustable means providing a fifth signal; summing means obtaining the difference of said fourth and fifth signals; and further means controlled by said summing means and adjusting the gain of said control means for various values of said combined signal, to obtain close following of said aircraft response and model output.

2. Control apparatus for an aircraft having a control surface for applying a variable moment about an axis of the craft, comprising, in combination: a source of control signal; a model simulating a desired response of the craft and receiving said signal and developing an output signal in accordance with such desired response; a craft flight condition sensing means developing a third signal varying in magnitude in accordance with said flight condition; combining means for said output and third signals; a control means developing an output in accordance with an input applied thereto and responsive to said combining means; a servomotor operated by said control means and operating said surface at a rate in accordance with the magnitude of output of said control means; means responsive to cyclic motions of said servomotor and developing a fourth signal; means converting said fourth signal to an absolute value; selective means providing a fifth signal; summing means obtaining the difference of said absolute fourth signal value and fifth signal; and further means controlled by said summing means and adjusting the gain of said control means for various differences of said output and third signals.

3. Control apparatus for a mobile craft having control means for altering the attitude of the craft about an axis thereof, comprising: a source of control signal, a model responsive to said signal and developing an output signal in accordance with a desired motion of the craft; a craft motion sensing means developing a third signal in accordance with the magnitude of craft motion; combining means for said output and third signals; control means including a linear amplifier having an output in accordance with input responsive to said combining means; a servomotor controlled by said control means and operating said control means in accordance with the output of said amplifier; means responsive to the motions of said servomotor and developing a fourth signal; means providing a selected fifth signal; summing obtaining the difference of said fourth and fifth signals; and further means controlled by said summing means and linearly adjusting the gain of said control means, for varying the ratio between the input to and the output from said control means.

4. In control apparatus for an aircraft having a control surface for applying a variable moment about an axis of the craft and a servomotor operating said surface at various rates, in combination: a source of control signal; a model responsive to said signal and developing an output signal in accordance with a desired response of the craft to such signal; a craft flight condition responsive means developing a third signal in accordance with said condition resulting from operation of said surface; means combining said output and third signals; a linear amplifier responsive to said combining means; means controlling said servomotor from said amplifier; means responsive to residual motions of said servomotor at a predetermined frequency and developing a fourth signal; means providing a fifth signal; summing means obtaining the difference of said fourth and fifth signals; and further means controlled by said summing means adjusting the gain of said amplifier to vary the amplitude of the residual motion of the servomotor.

5. In an adaptive automatic pilot for controlling an aircraft having a control surface for applying a variable moment to said craft about an axis thereof, said adaptive system including a source of control signal, a model responsive to said signal and developing an output signal in accordance with a desired response of the aircraft, a craft flight condition sensing means developing a third signal in accordance therewith, combining means for said output and third signals, a linear amplifier responsive to said combining means, and a servomotor controlled by said amplifier and operating said surface at a rate in accordance with the output of said amplifier, in combination: means responsive to the amplitude and frequency of oscillation of said servomotor, means for converting the amplitude of oscillation to an absolute quantity varying with the amplitude magnitude, means setting up a desired magnitude quantity, summing means obtaining the difference of said desired magnitude and absolute magnitude quantities, a gain control for said amplifier, and further means adjusting said gain from the summing means.

6. Control apparatus for an aircraft having a control surface for applying a variable angular movement about an axis of the craft, comprising: a source of control signal voltage; a model responsive to said signal voltage and developing an output signal voltage in accordance with a desired response of the aircraft to an input signal; a craft flight condition sensing means developing a third signal in accordance therewith; means combining said output and third signals; a linear amplifier responsive to said combining means and developing an output variable in accordance with the input signal thereto from said combining means; a servomotor controlled by said amplifier and operating said surface at a rate in accordance with the variable output of said amplifier; means responsive to cyclic motions of said servomotor and developing a fourth signal; means providing a variable fifth signal; summing means obtaining the difference of said fourth and fifth signals; and further means controlled by said summing means and adjusting the gain of said amplifier, whereby the outputs of said amplifier, in maintaining a desired amplitude of cyclic motion of the servomotor, for similar inputs thereto may be represented by lines passing through an origin and having various angles of slope.

7. In an automatic pilot for an aircraft having a control surface and a closed loop system operating said surface, said closed loop system comprising an input voltage source, a follow-up voltage source responsive to a flight condition sensor, a linear amplifier, and a servomotor operated by said amplifier and controlling operation of said surface, said amplifier being responsive to an error voltage derived from the difference of the input and follow-up voltages; means for controlling the gain of the closed loop system to maintain its operation close to the neutral stability point of the closed loop system comprising, further means responsive to the amplitude of the motion of the servomotor at the frequency of the system response adjacent the neutral stability point and the amplitude of a selected magnitude, varying the gain of said amplifier.

8. In an automatic condition control apparatus having a condition changing device and a closed loop system operating said device said closed loop system comprising an input signal source and a follow-up signal source responsive to a condition change rate sensor, an amplifier providing a linear output to linear input, and a servomotor controlling operation of said condition changing device, said amplifier being controlled by an error signal derived from the difference of said input and follow-up signals; means for controlling the gain of the closed loop system to maintain its operation close to the neutral stability point of the closed loop system comprising means responsive to a signal in accordance with the amplitude of motion of the servomotor at the frequency of the closed loop system response to the error signal approximately at the neutral stability point and selected magnitude signal for varying the gain of said amplifier.

9. In control apparatus for an aircraft having a control surface for applying a variable moment about an axis of the craft and a servomotor operating said surface at various rates, in combination: a source of control signal; a model responsive to said signal and developing an output signal in accordance with a desired response of the craft to such signal; a craft flight condition responsive means developing a third signal in accordance with the flight condition resulting from operation of said surface; means combining said output signal and said third signal; control means including an amplifier, responsive to said combining means and developing a linear output in accordance with the difference of said output and third signals; additional means controlling said servomotor from said further means; filter means responsive to residual motions of said servomotor at a predetermined frequency and developing a fourth signal; means providing a fifth signal; summing means obtaining the difference of said fourth and fifth signals; and further means controlled by said summing means adjusting the maximum average output of said control means.

10. In condition control apparatus having a condition control device and a servomotor operating said device variable extents, in combination: a source of control signal; a model responsive to said control signal and developing an output signal in accordance with a desired response of the control apparatus to such control signal; a condition rate responsive means developing a third signal in accordance with said condition change rate resulting from operation of said device; means combining said output and third signals; further means comprising an amplifier, controlled by said combining means and having an average output varying with the difference of said output and third signals; means controlling said servomotor from said further means; filter means responsive to residual motions of said servomotor at a predetermined frequency and developing a fourth signal; selective means providing a fifth signal; summing means obtaining the difference of said fourth and fifth signals; and additional means controlled by said summing means linearly adjusting the average or maximum output of said further means.

11. In control apparatus for an aircraft having an aileron control surface for applying a variable moment about a longitudinal axis of the craft and a servomotor operating said aileron surface at various rates, in combination: a source of control signals; a model responsive to said control signal and developing an output signal in accordance with a desired response of the craft to said control signal; a craft flight condition responsive means developing a third signal in accordance with the flight condition resulting from operation of said surface; means combining said output and third signals; further means, including an amplifier, responsive to said combining means and developing an output varying with the difference of said output and their signals; means for limiting the maximum output of said further means; means controlling said servomotor from said further means; means responsive to residual motions of said servomotor at a predetermined frequency and developing a fourth signal; means providing a selected fifth signal; summing means obtaining the difference of said fourth and fifth signals; and additional means controlled by said summing means adjusting the maximum output of said further means, to vary the amplitude of the residual motion of the servomotor.

12. In an automatic condition control apparatus having a condition changing device and a closed loop system operating said device, comprising: an input signal source; a follow-up source responsive to a function of a change in said condition, further means comprising an amplifier responsive to an error signal derived from the difference of said input signal and follow-up signal, said further means including means limiting the output thereof; means for linearly controlling the output of said further means in accordance with said error signal; additional means controlling said servomotor from said further means; and means responsive to cyclic motions of said servomotor adjusting the maximum output of said further means.

13. In control apparatus for an aircraft having a control surface for applying a variable moment about the axis of a craft and a servomotor operating said surface at various rates, in combination: a source of control signal; a model responsive to said signal and developing an output signal in accordance with a desired response of the craft to such control signal; a craft flight condition responsive means developing a third signal in accordance with said condition resulting from operation of said surface; means combining said output and third signals; a control means responsive to said combining means; means responsive to residual motions of said servomotor at a predetermined frequency and developing a fourth signal; means providing a fifth signal; summing means obtaining the difference of said fourth and fifth signals; and further means controlled by said summing means and adjusting the gain of said control means for various values of the signals from said combining means to vary the gain of said control means to maintain the forward loop gain of the control apparatus at the highest stable value for all flight conditions of said craft.

14. Control apparatus for an aircraft having a control surface for applying a variable moment about the roll axis of the craft comprising, in combination: a source of control signal, a model simulating a desired response of the craft and receiving said signal and developing an output signal in accordance with such desired response, a roll rate sensing device developing a third signal varying in magnitude in accordance with roll rate of the craft, combining means for said output and third signals, a control means developing an output in accordance with an input applied thereto and responsive to said combining means, a servomotor operated by said control means and controlling said surface at a rate in accordance with the magnitude of output of said control means, means responsive to cyclic motions of said servomotor at a predetermined frequency and developing a fourth signal, means converting said fourth signal to an absolute value, selective means providing a fifth signal, summing means obtaining the difference of said absolute fourth signal value and said fifth signal, and further means controlled by said summing means and adjusting the control means to maintain the forward loop gain of said apparatus at the highest stable value for all flight conditions to thus compensate for changes in aircraft control surface effectiveness.

References Cited in the file of this patent

UNITED STATES PATENTS

| | | |
|---|---|---|
| 2,948,494 | Curry | Aug. 9, 1960 |
| 2,958,483 | McRuer | Nov. 1, 1960 |